(12) United States Patent
Humele et al.

(10) Patent No.: US 8,500,438 B2
(45) Date of Patent: Aug. 6, 2013

(54) DEVICE FOR STRETCH BLOW MOLDING AND METHOD FOR PRODUCING PREFORMS

(75) Inventors: Heinz Humele, Thalmassing (DE); Karl-Heinz Achhammer, Wörth/Donau (DE); Wolfgang Hausladen, Motzing (DE); Franz Gmeiner, Sinzing Ortsteil Eilsbrunn (DE)

(73) Assignee: Krones AG, Neutraubling (DE)

( * ) Notice: Subject to any disclaimer, the term of this patent is extended or adjusted under 35 U.S.C. 154(b) by 578 days.

(21) Appl. No.: 12/738,483

(22) PCT Filed: Oct. 13, 2008

(86) PCT No.: PCT/EP2008/008651
§ 371 (c)(1),
(2), (4) Date: Jun. 21, 2010

(87) PCT Pub. No.: WO2009/049848
PCT Pub. Date: Apr. 23, 2009

(65) Prior Publication Data
US 2010/0276847 A1 Nov. 4, 2010

(30) Foreign Application Priority Data
Oct. 17, 2007 (DE) .......................... 10 2007 049 689

(51) Int. Cl.
*B29C 49/06* (2006.01)
*B29C 49/08* (2006.01)
*B29C 49/36* (2006.01)

(52) U.S. Cl.
USPC ......................................................... 425/529

(58) Field of Classification Search
USPC ......................................................... 425/529
See application file for complete search history.

(56) References Cited

U.S. PATENT DOCUMENTS

| 3,357,046 A | 12/1967 | Pechthold |
| 4,242,073 A | 12/1980 | Tsuchiya et al. |

FOREIGN PATENT DOCUMENTS

| DE | 3124523 A1 | 6/1982 |
| DE | 19528695 A1 | 2/1997 |
| DE | 19737697 A1 | 3/1999 |
| GB | 2294896 A | 5/1996 |
| WO | WO-2005/102642 A1 | 11/2005 |

*Primary Examiner* — Joseph Del Sole
*Assistant Examiner* — Ryan Ochylski
(74) *Attorney, Agent, or Firm* — Marshall, Gerstein & Borun LLP

(57) ABSTRACT

A device for the stretch blowing of plastic containers in a continuous single-stage process, having at least one injection rotor, with injection molds for preforms, which are fed via controlled valves from an extruder head and by way of a melt distributor from a central extruder, wherein the axis of the extruder is placed at least essentially in the axis of the injection pipe, and at least the extruder head and the melt distributor can be permanently and synchronously rotationally driven by the injection rotor. A method where, during the manufacture of each preform in the injection mold, injection molding phases and a compression molding or dwell pressure phase are combined and superimposed.

33 Claims, 7 Drawing Sheets

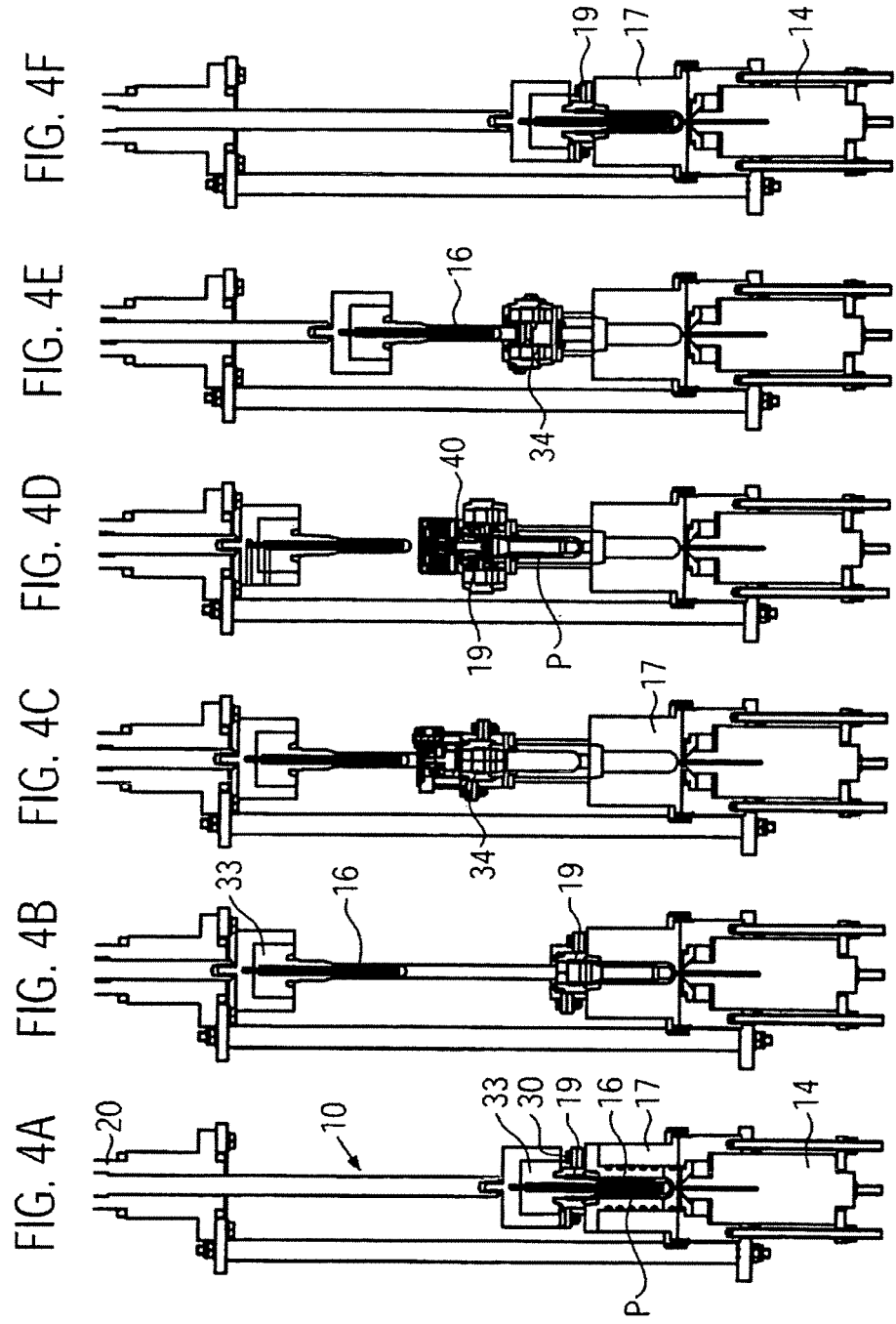

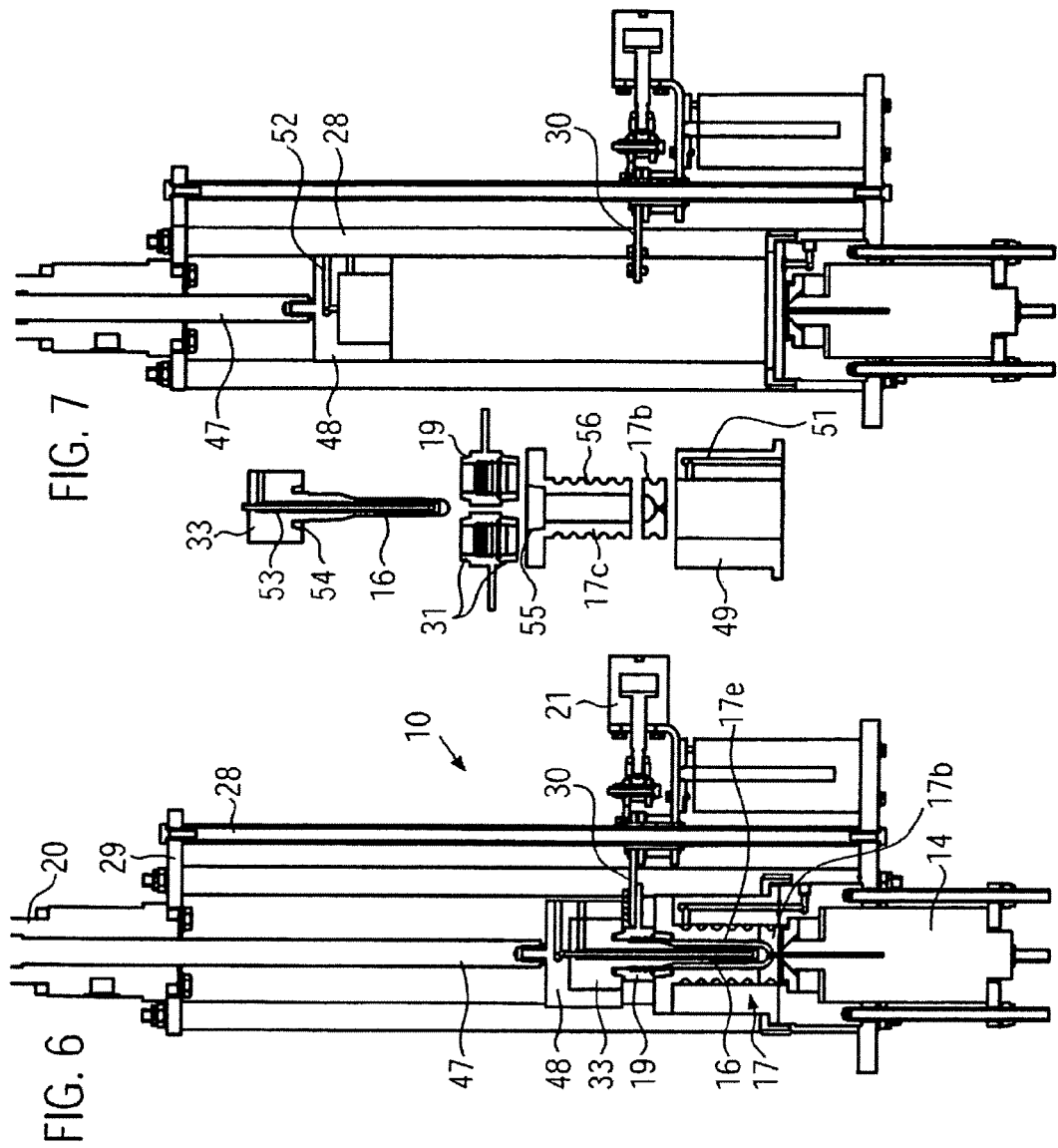

DEVICE FOR STRETCH BLOW MOLDING AND METHOD FOR PRODUCING PREFORMS

CROSS-REFERENCE TO RELATED APPLICATION

The present application claims the benefit of priority of International Patent Application No. PCT/EP2008/008651, filed Oct. 13, 2008, which application claims priority of German Application No. 10 2007 049 689.5, filed Oct. 17, 2007. The entire text of the priority application is incorporated herein by reference in its entirety.

FIELD OF THE DISCLOSURE

The disclosure relates to a device and a method for stretch blowing of plastic containers in a continuous single stage process, such as for beverage bottling operations.

BACKGROUND

A known device according to DE 197 37 697 A for implementing a single-stage process has a central stationary extruder which alternately feeds two injection rotors via a two-way controlled valve. During injection molding one injection rotor is stationary while the other injection rotor is rotationally driven and transfers the preforms to a transfer carousel with cooling devices. A rotary distributor is arranged in each injection rotor which sequentially feeds the injection molds via controlled injection valves. The respective injection valve is only actuated when the injection mold has been first closed by the inner arbor, which has moved to the end position, and has been fixed.

With a device known from DE 31 24 523 A a central extruder is arranged stationary. Sequentially controlled needle valves fill the cavities of each of four injection molds which are combined, forming a unit. The injection rotor is stationary. Four rotationally driven blowing rotors are arranged on the circumference of the injection rotor. Transfer grippers grip the openings of the preforms to transfer them in groups.

With the device known from U.S. Pat. No. 3,357,046 A two extruders are provided, which operate continuously and are mounted diametrically opposite on a disk-shaped carrier. The carrier rotates about its axis until in a respective discharge position, it remains stationary in the discharge position or it is at least largely retarded before a billet emitted from the extruder is parted off and transferred to a stretch-blowing mold located stationary beneath it.

With the device known from DE 195 28 695 for realizing a single-stage process expanding arbors, which engage in the opening of the respective preform, are used for transferring the preforms manufactured by injection molding. A stationary central extruder alternately feeds two injection molds which can move to and fro along an arc-shaped guide.

SUMMARY OF THE DISCLOSURE

One aspect of the disclosure is to optimize a device of the type mentioned in the introduction for an efficient single-stage process with a high output capacity. Part of the aspect is to provide an improved method of manufacturing the preforms.

With the device to be realized one aspect is to obtain a continuously running single-stage process without delays or intervening stops, which facilitates a small extruder size, with optimum use of the number of cavities, wherein the device should be characterized by low mold costs and a modular construction for easy servicing. According to the method one aspect is to shorten the injection time and possibly the dead times, to achieve a high preform quality due to careful handling of the melt and to increase the performance per cavity and to save energy through an optimized process sequence.

With this device, through the at least mutually rotating extruder head and the rotary distributor, a high realizable injection pressure is produced with a shorter process time, reinforced if necessary by a melt pump, wherein a small extruder size is sufficient and, where necessary, the large number of cavities in the injection molds can be optimally used. These advantages are paired with low mold costs, because the needle valves can be integrated into the machine module, and with high service friendliness due to the modular construction of the device.

According to the method, shortening the injection time and the dead times can be achieved, because the injection mold does not need to be completely closed at the start of the process, i.e. the nozzle mold can be open or raised. The melt, flowing initially under low pressure, is not immediately cooled by the cold inner arbor, but can rather spread out evenly at least in the bottom section of the subsequent preform. A metering unit is not needed and problems with portioning accuracy are eliminated, as are specific dwell pressure problems. Low pressing forces are sufficient for the adjustment of the inner arbor, because during the compression molding phase no final shaping of the preform has occurred yet. In this way the melt is handled carefully and a high quality is produced in the preform. The performance per cavity can be increased. Energy is saved by the optimized process sequence. The dwell pressure phase, superimposed if necessary, prevents shrinkage.

In a practicable embodiment the complete extruder can be rotationally driven together with the injection rotor. The extruder can be fitted from above or below, preferably separable, on the injection rotor.

In a practicable embodiment the extruder, practicably arranged vertically above, has a rotationally drivable pressure section surrounding the extruder nozzle and a stationary charging section. The charging section is preferably fixed relative to the injection rotor via a torque support and facilitates a convenient granule feed, for example via one or more stationarily arranged feed devices. Between the pressure section and the charging section a sealed rotary joint is provided so that the extruder nozzle rotates with the pressure section while the charging section remains stationary. Since the melt fed in from the extruder is brought on the shortest path to the injection molds so that no constrictions or significant deviation sections exist, a relatively small extruder size is sufficient, because the process runs continuously and not in cycles as in prior art.

Expediently, the rotary distributor, which rotates with the extruder nozzle and the injection rotor, has a multi-channel disk connected to the extruder head, preferably able to be uncoupled, which is connected via, preferably heated, pipes or hot channels to controlled needle valves installed in the injection rotor mold holders. Thus, only equally long transfer paths are present and a permanent, continuous flow of melt is ensured.

Since various media, e.g. a cooling medium, compressed air, hydraulic medium, electrical power for control and supply, a cleaning medium, etc. are required, and the supply must also be ensured during the operation of the injection rotor, another rotary distributor for these working media is practicably arranged on the side of the rotary distributor facing away from the extruder head.

An especially important feature of the disclosure is that each injection mold has a bottom and body mold, an openable, preferably cooled, nozzle mold and inner arbor which is axially adjustable through the nozzle mold, movable and preferably internally cooled. In this way an exactly controllable temperature distribution is possible in the preform.

In a preferred embodiment each injection mold has a bottom and body mold and a nozzle mold, which is movable relative to the bottom and body mold together with an internally cooled and internally hollow inner arbor, and which can be opened. The melt injection valve is a metering needle valve, which can be connected to the inner arbor to feed the cavity through the hollow inner arbor. The metering needle valve supplies an exactly predetermined charge of melt, wherein the charge is dimensioned such that shrinkage in the preform is avoided. Since the melt is fed through the hollow inner arbor, the bottom and body mold can be formed more simply. As with the bottom and body mold, the hollow inner arbor is cooled internally in order to optimize the temperature distribution in the preform.

With this embodiment the inner arbor has an inner through channel which opens into the region of the free end of the arbor and into which the melt charge can be brought into the cavity via the metering needle valve. In the inner channel a needle is arranged, which can be moved between a withdrawn feed position through a melt dwell pressure stroke to a closed position which closes the opening of the inner channel. The complete melt charge is introduced into the cavity through the controlled metering needle valve and in fact in three consecutive or contiguous steps. Initially, with the inner arbor raised out of the cavity, a first part of the charge is introduced into the cavity through the inner channel of the inner arbor with a low pressure until a filling level is obtained here below the location of the nozzle mold. Then the inner arbor together with the nozzle mold is lowered, wherein the initial melt filling is compressed at a low pressure by the insertion of the inner arbor in the direction of the location of the nozzle mold. Once the nozzle mold is blocked with the bottom and body mold, and the inner arbor has reached its lower end position and has been fixed, i.e. the cavity is tightly closed, the second part of the melt charge is injected by the metering needle valve through the inner channel until the region of the nozzle mold is filled. In this phase a residue of melt volume remains in the inner channel. This remaining melt volume is finally pressed into the cavity in a dwell pressure phase by inserting the needle through the inner channel of the inner arbor in order to prevent shrinkage. The needle is pressed so far in until finally the opening of the inner channel of the inner arbor closes.

Expediently, at its free end the needle has a dwell pressure stamp with the diameter of the opening of the inner channel. This stamp presses the remaining melt volume out of the inner channel into the cavity and finally closes the opening. After production of the preform the nozzle mold is lifted out of the cavity together with the inner arbor, wherein the preform remains on the inner arbor. Then the nozzle mold is opened and the preform removed from the inner arbor and transferred to the conditioning section. In this phase the needle with the stamp is again withdrawn so far that the inner channel of the inner arbor is free again for feeding the next melt charge. In doing this the stamp closes the inner channel at the top.

Expediently, transfer expanding arbors, which can be actuated for the removal of the preforms in each case from the opened nozzle mold, are assigned to the injection molds in the conditioning section, preferably rotatable in the conditioning section. Each preform is grasped inside in the nozzle and precisely conditioned in the conditioning section in order to have the correct temperature profile for stretch blowing, in particular in the regions in which the most severe deformation occurs during stretching and blowing, while the nozzle remains cool with the final shape in the injection mold and along the conditioning section.

In order to simplify the transfer of the preforms along the shortest path and matched to the rotational speed of the blowing rotor, an entry carousel with transfer elements for preforms removed from the transfer expanding arbors is provided between the blowing rotor and the conditioning section.

With another, particularly important embodiment, each injection mold has in each case openable bottom and body molds and a preferably cooled nozzle mold as well as an inner arbor which can be moved through the nozzle mold and removed from the injection mold. During the complete injection process and in the conditioning section, the inner arbor serves as a carrier for the preform and is, for example, not cooled. However, on the return path along the conditioning section into the injection rotor each inner arbor can be cooled so far that it exerts no unwanted temperature effect on the preform produced.

Expediently, the removable inner arbor is provided with an adapter part on which transfer grippers, arranged on a link chain in the conditioning section, grasp to remove or accept the inner arbor with the preform and to transport it along the conditioning section.

Since the preforms are relatively firmly seated on the inner arbors, with one practicable embodiment a preform removal and transfer device is provided in or along the conditioning section, for example a cam-controlled lowering device with which the preforms can be removed from the inner arbors and transferred to a transfer carousel which interacts with an entry carousel of the blowing rotor.

With a further, alternative and important embodiment an openable and removable nozzle mold is included in each injection mold. The inner arbor remaining in the injection mold is practicably cooled internally. The nozzle mold is removed together with the finished preform by means of transfer elements and at least transported along the conditioning section, preferably even into the blow-molds of the blowing rotor so that in this case each nozzle mold serves as a transfer element remaining on the preform and used again in the blow-mold.

With regard to quick and precise opening and closing movements of the nozzle mold, in a practicable embodiment of the nozzle mold a pneumatic cylinder is assigned to an articulated lever mechanism. The closing force of the nozzle mold is however realized by blocking with the body mold and/or with the inner arbor.

Here, the inner arbor is effectively adjusted by a hydraulic cylinder which applies a high closing force, e.g. a hydraulic cylinder with a power capacity of about 8 tons.

For conveying the melt and for a uniform effect of the melt flow, a buffer zone can be practically formed in the extruder in the region of the rotary joint.

In an alternative embodiment the conditioning section is even variable in length. This can be realized either by adjustment or by replacement of the link chain and an offset in the diversion mechanism.

With regard to compact dimensions of the device, the conditioning section can be a rotor-shaped conditioning section, which carries a link chain with transfer expanding arbors on its circumference. Alternatively, the conditioning section can however be formed as a longitudinally extended conditioning loop with a circumferential link chain and e.g. inner-arbor transfer grippers arranged on it.

For thermally conditioning the preforms at least one preform cooling station is assigned between the injection rotor and the entry carousel to the conditioning section which is practicably formed as a conditioning circuit.

With another embodiment at least one cooling station with which the inner arbor is cooled on the return path is provided on the conditioning section formed as a conditioning loop in the return trunk between the transfer carousel and the injection rotor.

Finally, in order to be able to overcome problems due to separation delay it is practicable to especially form the conditioning section formed as conditioning circuit as a separation delay section in which the preform rotates.

According to the method, during the manufacture of high quality preforms initially only a part of the cavity is filled under low pressure with melt from the needle valve in the absence of the inner arbor and in fact up to a filling level below the nozzle mold. Thereafter this melt filling is displaced under low pressure in the direction towards the nozzle mold by adjusting the inner arbor in the direction towards the end position. Only then is the inner arbor fixed in the end position before the remaining melt volume is injected under increased pressure.

This occurs for example in that, with the inner arbor not yet inserted into the cavity and into the end position, the needle valve is opened and, metered under low pressure, melt is introduced into the bottom and body mold. In the absence of the cool inner arbor the melt can be conveniently distributed before the inner arbor is then moved into the end position under the displacement of melt in the direction of the nozzle mold and blocked with the nozzle mold with the required closing force. The cavity is then closed and the remaining melt volume is injected under high pressure, metered out of the needle valve, until the preform is produced.

With a practicable variant of the method a dwell pressure phase is superimposed on the injection molding of the preform to prevent shrinkage. The cavity is initially partially filled by the inner arbor under low pressure with the inner arbor still withdrawn and the nozzle mold lifted. Then the inner arbor with the nozzle mold is lowered and blocking occurs, wherein the initial melt filling is displaced under low pressure by the inserted inner arbor. After blocking, the remainder of the melt charge, except the remaining melt volume in the inner channel of the inner arbor, is introduced into the cavity. Once the metering needle valve has been closed, a needle is pushed through the inner channel to press the rest of the melt volume into the cavity in the dwell pressure phase, thus preventing shrinkage.

Furthermore, according to the method even the nozzle mold can be closed first or placed upon the body mold and/or the inner arbor first introduced once sufficient melt has been introduced in one part of the cavity without contact with the inner arbor. This saves process time and facilitates an initially low pressure.

BRIEF DESCRIPTION OF THE DRAWINGS

Embodiments of the object of the disclosure are explained based on the drawings. The following are shown.

DETAILED DESCRIPTION OF THE PREFERRED EMBODIMENT

Figure 1:
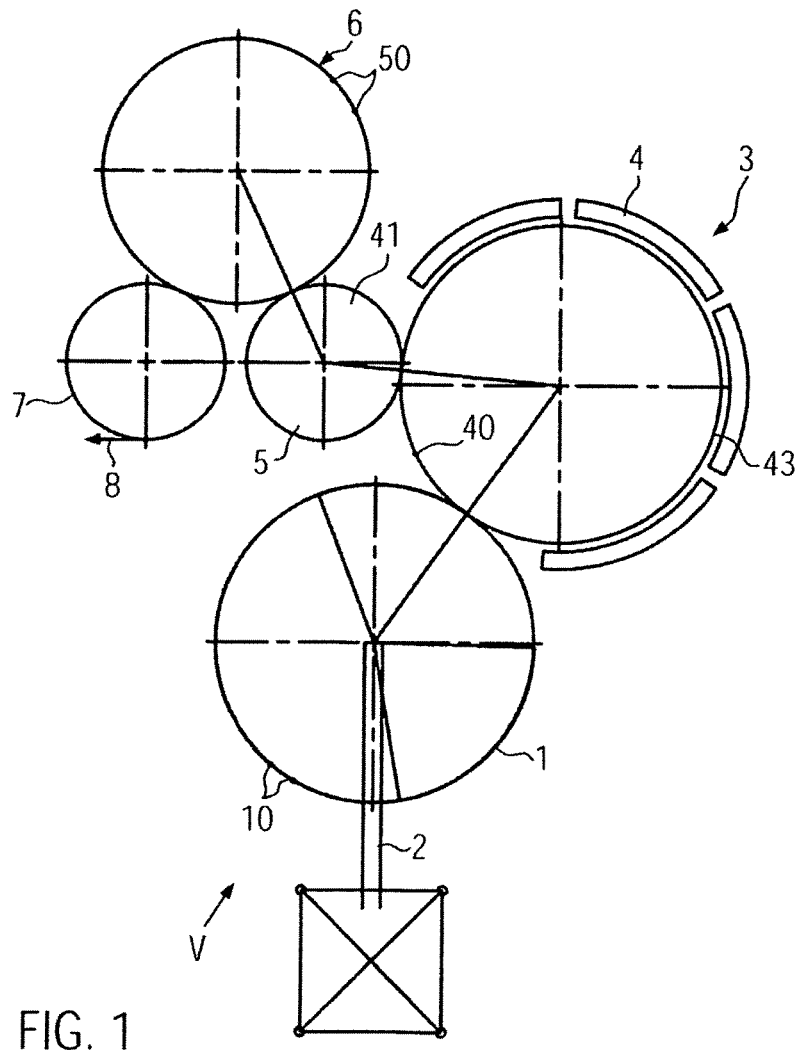
FIG. 1 a schematic plan view of a first embodiment of a device for the stretch blowing of plastic containers in a single-stage process, FIG. 2 a side view, partially sectioned, of an injection rotor of the embodiment in FIG. 1, FIG. 3 a detailed perspective view of an injection mold in the injection rotor of FIG. 1, FIGS. 4A to 4F side views of individual steps in the movement sequence of the embodiment of the injection mold of FIG. 1, FIGS. 5A to 5C sectional illustrations of an injection mold in three consecutive process steps, FIG. 6 a side view, partially sectioned, of a version of an injection mold 10 in the closed state, wherein more details are highlighted compared to the illustration in FIG. 4A, FIG. 7 the injection mold of FIG. 6 in the disassembled state, FIG. 8 a schematic plan view of a further embodiment of the device, FIG. 9 a detailed perspective view of the injection rotor in the embodiment of FIG. 6 and FIG. 10A to 10D a further version of an injection mold in four process steps.

FIG. 1 shows in a plan view a device V for the stretch blowing of plastic containers, in particular PET bottles, in a single-stage process. The individual components of the device V are arranged in a modular design compactly with respect to one another and comprise an injection rotor 1, which is combined with an extruder 2, which at least partially rotates with it, and which interacts with an adjacent conditioning section 3, formed here as a conditioning circuit, to which several cooling and/or heating stations 4 are assigned. The conditioning section 3 cooperates with a feed carousel 5, which for its part operates together with a blowing rotor 6 for stretch blowing the containers, from which finished containers are transported away by a discharge carousel 7 in the arrow direction 8. Several injection molds 10 are arranged on the injection rotor, e.g. in the circumferential region. In the conditioning section 3 transfer expanding arbors 40 are provided as transfer elements on movable arms of a separation delay carousel 43. The entry carousel 5 also has transport or transfer elements which transfer the preforms P coming from the injection rotor 1 to blow-molds 50 of the blowing rotor 6.

Figure 2:
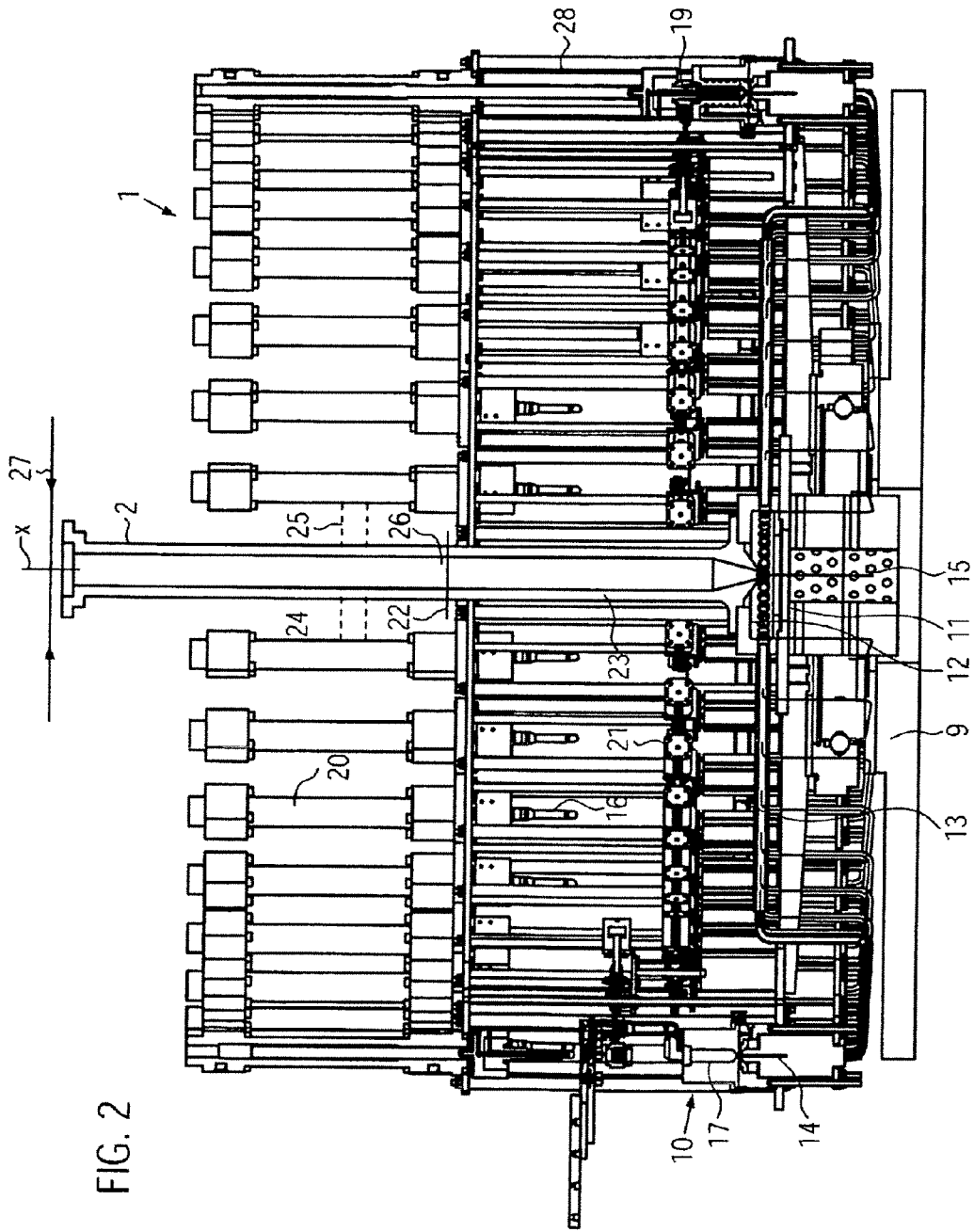

According to FIG. 2 the injection rotor 1 is arranged for rotational drive on a carrier 9 situated on the underside and fitted with the injection molds 10 arranged in the carriers located in the tension rod 28. In the center of the injection rotor 1 a rotary distributor 11 is arranged, which comprises a multi-channel disk 12 and pipes 13 (heating channels with heaters) leading to controlled needle valves 14 on the injection molds 10. Furthermore, with the illustrated embodiment a media rotary distributor 15 for working media of the injection rotor 1 is arranged centrally underneath (cooling medium, cleaning medium, heating medium, compressed air, hydraulic medium, control or supply current, etc.).

Each injection mold 10 contains an inner arbor 16, which can be linearly adjusted by means of a hydraulic cylinder or a servo-operated closing spindle (designated as servo in the following) 20, a single-part or divided bottom and body mold 17 and a divided or openable nozzle mold 19. Each nozzle mold 19 is opened or closed by means of a pneumatic cylinder 21 and an articulated lever mechanism 30 illustrated in FIG. 3 and blocked in the closed position through conical mold closure by means of the hydraulic cylinder or servo 20 via the inner arbor 16. Expediently, the inner arbor 16 is internally cooled and the nozzle mold 19 is also cooled.

The central extruder 2 is essentially in the X axis of the injection rotor 1 and at the top (alternatively at the bottom), wherein at least the extruder nozzle rotates synchronously with the injection rotor 1. Expediently, the extruder housing is divided into a high-pressure part 23 with the extruder nozzle and a charging part 24. The high-pressure part 23 interacts with the charging part 24 via a sealed rotary joint 22 such that the charging part 24 is stationary when the high-pressure part 23 rotates, for example is held via a torque support 25 relative to the injection rotor 1. Inside the housing of the extruder 2 there is at least one extruder screw 26, which is not highlighted in further detail and which rotates with a movement relative to the high-pressure part (23). The extruder is supplied with plastic granules, for example, via at least one stationary granule feed screw 27.

Figure 3:
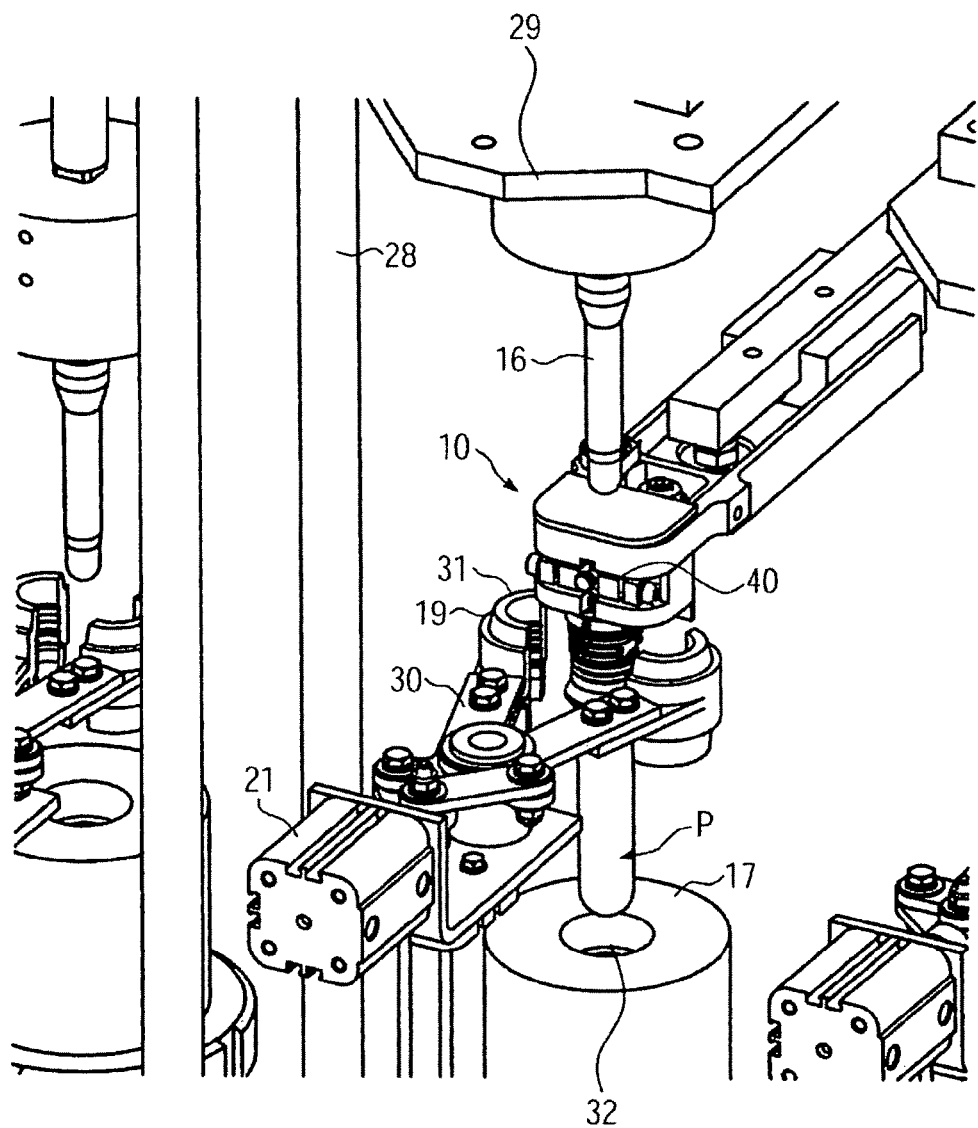

FIG. 3 illustrates the opened injection mold 10, to which access is possible on four sides through the columns 28 and a carrier plate 29 of a mold holder. The pneumatic cylinder 21 has already opened the nozzle mold 19 via the articulated lever mechanism 30. On the upper side of the nozzle mold 19 a closing cone 31 can be seen which interacts with a counter cone in a carrier of the inner arbor 16 in order to establish the required closing pressure in the closed position of the nozzle mold 19. The finished preform P is pulled out of a cavity 32 of the body and bottom mold 17 by a height-adjusting movement of the nozzle mold 19 and already coupled to a transfer expanding arbor 40, which is not highlighted in further detail (or a sidewards moving gripper), which conveys the preform P into the conditioning section 3. In this embodiment the body and bottom mold 17 does not need to be separable nor openable.

The transfer expanding arbor 40 grasps inside into the opening of the preform P, which in this operating phase is stable and has a low temperature. The transfer expanding arbor 40 is then transferred with the preform on a separation delay carousel 43 into the conditioning section 3, wherein the transfer expanding arbor 40 rotates and the preform is conveyed past the cooling stations 4 until the correct temperature profile is obtained. Then grippers 41 on the entry carousel 5 accept the respective preform and transfer it to a blow mold 50 of the blowing rotor 6. The usual stretch-blowing process occurs with further rotation of the blowing rotor 6.

FIGS. 4A to 4F illustrate a possible movement sequence in the injection mold 10.

In FIG. 4A the injection mold is still closed after the completion of an injection process. The needle valve 14 closes off. A carrier 33 of the inner arbor 16 blocks the closed nozzle mold 19. The articulated lever mechanism 30 is closed.

In FIG. 4B the inner arbor 16 is moved upwards with its carrier 33. Now the nozzle mold 19 is moved upwards together with the articulated lever mechanism 13 and the pneumatic cylinder 21 into the position in FIG. 4C together with the preform. In this way the blocking between the nozzle mold 19 and the body and bottom mold 17 is released. The transfer expanding arbor is moved up and the preform with the nozzle mold mechanism 34 is moved into the transfer expanding arbor 40 of the conditioning section 3.

In FIG. 4D the nozzle mold 19 has been opened and the preform P is already seated on the transfer expanding arbor 40, which swivels it out of the injection carousel.

In FIG. 4E the nozzle mold mechanism 34 is again retracted and lowered and the nozzle mold 19 is closed. The inner arbor 16 is lowered.

In FIG. 4F the inner arbor 16 has reached its lower end position and is blocked with the nozzle mold 19, which for its part is also blocked with the body and bottom mold 17. The needle valve 14 opens and begins a new injection process.

Figures 5A, 5B, 5C:
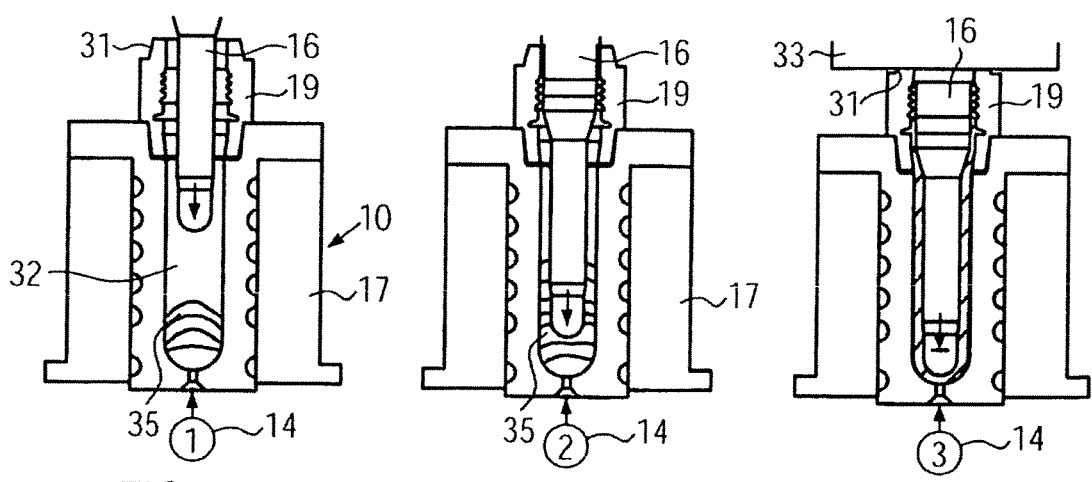

The movement sequence in FIGS. 4A to 4F can be practicably modified somewhat in order to realize a method according to FIGS. 5A to 5C in which an injection molding process is combined with or superimposed by a compression molding process. This means that according to FIG. 5A, in contrast to FIGS. 4E and 4F, the inner arbor 16 has not yet moved downwards into the end position and, if necessary, even the nozzle mold 19 is also not yet placed in position and closed when, with the opening of the needle valve 14, which is displacement/time controlled as required, melt 35 flows metered under slight pressure initially into the cavity 32 of the bottom and body mold 17. In contrast to the illustration in FIG. 4F, now first with a still open needle valve in FIG. 5B, the inner arbor 16 is inserted into the melt 35 in the direction of the end position, wherein it displaces melt 35 in the direction towards the nozzle mold 19. The nozzle mold 19 has, where necessary, only now or still not been blocked with the body and bottom mold 17 and closed. In the sequence according to FIG. 5C the inner arbor 16 is moved up into the end position and blocked by means of the carrier 33 with, as applicable, the cone 31 of the now lowered, closed nozzle mold 19, so that the cavity 32 is closed. The required closing force is produced via the servo 20. The remaining melt volume is then injected under high pressure according to a conventional injection molding process.

The advantages of the method outlined based on FIGS. 5A to 5C are as follows:

The melt 35 flowing in under low pressure is not immediately cooled by the cold inner arbor 16, because it is still raised. Uniform spreading of the melt occurs, wherein shortening of the injection time can be achieved. Also, with this method shortening of the dead time arises, because the injection mold at the start of the process does not need to be completely closed. A metering unit is not needed and also no problems occur with regard to the portioning accuracy during compression molding. Similarly, a specific dwell pressure problem for the compression molding does not arise. Since no final molding occurs during the compression molding phase, only slight press forces are required for the inner arbor 16. Overall the melt is handled very carefully, resulting in a high quality preform. Overall an increase in the capacity per injection mold or cavity arises and energy can be saved due to the optimized process. This method is practicable for the device V according to FIG. 1 (or according to FIG. 8), but is also practicable for other stretch-blowing devices or preform injection molding devices.

In FIG. 6 the injection mold 10 is formed with a bottom and body mold 17 from a separate bottom mold 17*b* and a separate body mold 17*c* and the carrier 33 of the inner arbor 16 is seated in a carrier 48, which is connected to a piston rod 47 of the hydraulic cylinder or alternatively to the servo 20. In FIG. 6 the injection mold 10 is closed.

In FIG. 7 the injection mold 10 is illustrated in the disassembled state. The inner arbor 16 with its carrier 33 is withdrawn from the carrier 48. The inner arbor has cooling channels 53 which communicate with the cooling channels 52 in the carrier 48 when the carrier 33 is deployed. Also, a locking cone 54 below in the carrier 33 is shaped for cooperating with the locking cone 31 of the nozzle mold 19 and a locking cone 55 is also formed in the body mold 17*c*. The bottom mold 17*b* and the body mold 17*c* are consecutively introduced into a bush 49 which is mounted in the mold holder 28, 29 adjoining the needle valve 14 and includes channels 51 for cooling and/or heating, which communicate with channels 56 formed in the body mold 17*c* and bottom mold 17*b*. In FIG. 7 the articulated lever mechanism 30 is released from the nozzle mold 19.

Figure 8:
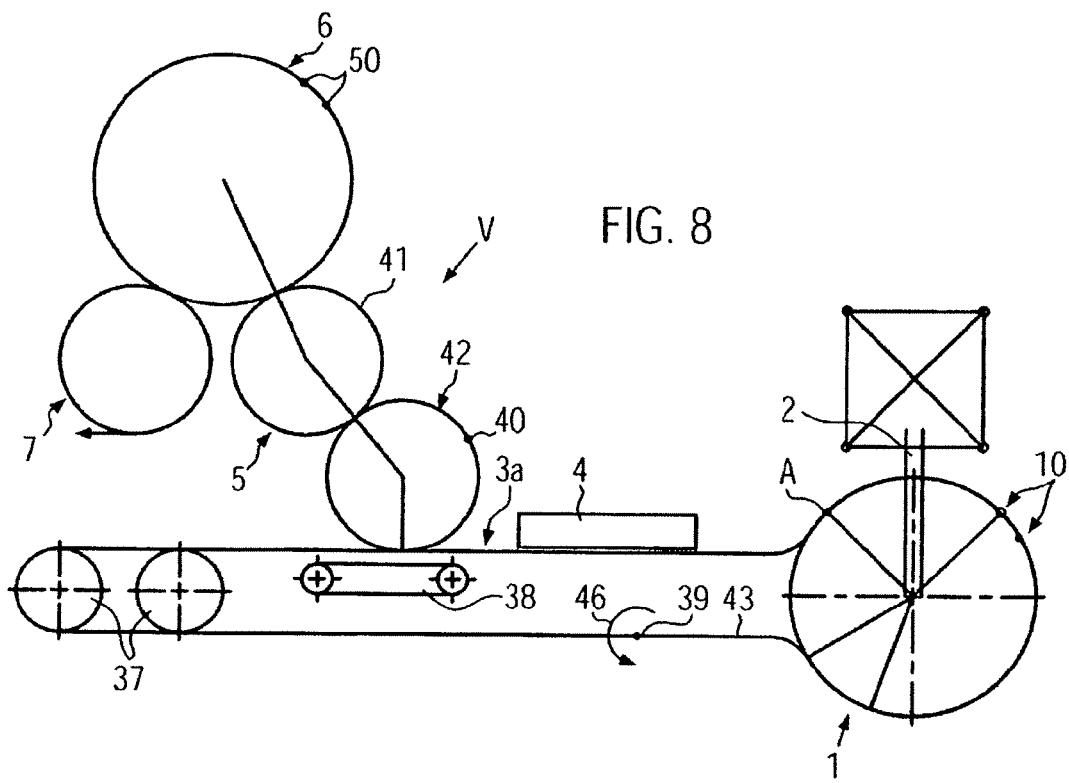

In the further embodiment of the device illustrated in FIG. 8 in a schematic plan view for stretch blowing plastic containers, in particular PET bottles, in a single-stage process the respective inner arbor 16 serves as a carrier for the preform P during the injection process and along the conditioning section. In this case the inner arbor 16 is not internally cooled.

In FIG. 8 on the injection rotor 1 with the mutually rotating extruder 2 a conditioning section 3a is connected, which is formed as a conditioning loop with the link chain 43, which also extends around the injection rotor 1. The conditioning section 3a can, as indicated with 37, be variable in length. On the link chain 43 grippers 39 are arranged, which for example are rotatable in the direction of the arrow 46 along the conditioning section 3a and are used to grasp adapter parts 44 of the inner arbors 16 illustrated in FIG. 9.

In FIG. 8 a transfer carousel 42, which for example is fitted with grippers 40 (e.g. expanding arbors), is arranged between the conditioning section 3a and the entry carousel 5. The grippers 40 accept the preforms P from a removal and transfer device 38 in the conditioning section 3a. The removal and transfer device 38 is for example a lowering device for the preforms transported from the inner arbors 16. A cooling station 4 between the transfer carousel 42 and the injection rotor 1 can be used for cooling the inner arbors 16 on the return path into the injection rotor 1. Further heating and/or cooling stations, which are not illustrated, can be used for conditioning preforms on the inner arbors 16. If necessary, preform cooling stations are assigned to the transfer carousel 42. Also, the device V illustrated in FIG. 8 is a modular design composed of single modules optionally combined together in a compact arrangement.

Figure 9:
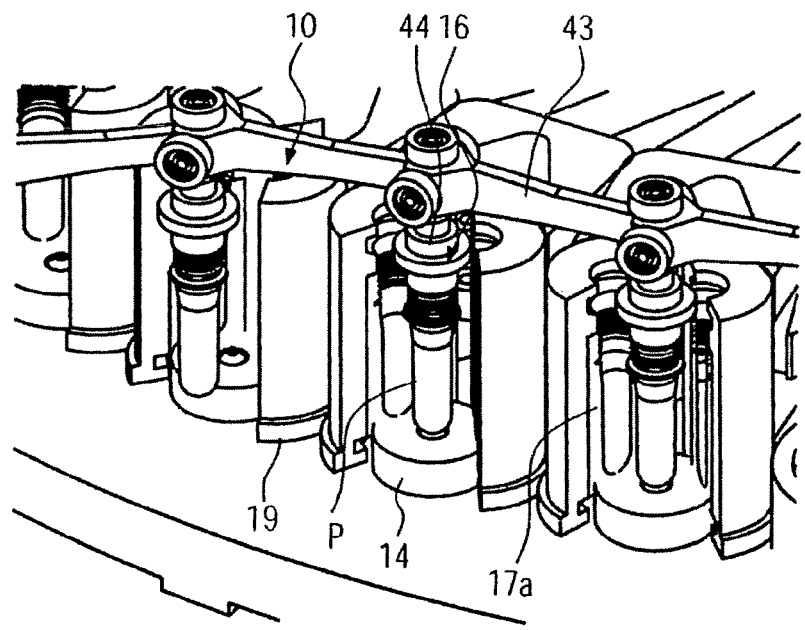

FIG. 9 shows that in each injection mold 10 the bottom and body mold 17a is separable and openable and also already includes the nozzle mold 19 in an openable version. The inner arbor 16 carries on top the adapter part 44 on which the gripper 39 on the link chain 34 grasps to remove the inner arbor 16 carrying the preform P from the opened injection mold 10 and to transfer it to the conditioning section 3a. If necessary, each inner arbor 16 is moved laterally after lifting to the waiting gripper 39 on the link chain 34. In this case the inner arbor 16 can be held like a bottom mold. The bottom and body mold 17 can be opened and closed together with the nozzle mold 19 by a pneumatic cylinder 21 (not illustrated) and an articulated lever mechanism 30. The blocking by the inner arbor 16 occurs via the hydraulic cylinder 20, which provides the required closing pressure and mold closure via appropriate cones and, where necessary, locking pins. The grippers 39 on the link chain 43 are designed such that they release the inner arbor 16 in the injection rotor 1 and rotate it along the conditioning section. The removal and transfer device 38 removes the preform P, which is brought to the required temperature profile, from the inner arbor 16 by pulling it off downwards and transfers the preform to the transfer carousel 42. Then the empty inner arbors 16 are cooled during the return transport into the injection molds 10.

According to the embodiment of FIG. 2, the mutually rotating extruder 2 is arranged for example suspended on the injection rotor 1 centrally and above using a torque support, with the rotary distributor 11 arranged below the extruder nozzle, from which the individual needle valves 14 below the injection mold 10 are supplied. The needle valves 14 here belong to the machine module. The modular design is service-friendly.

In an alternative embodiment, which is not shown in detail and which is explained based on FIGS. 8 and 9, the inner arbors 16 are not used as carriers for the preforms P on the path to the blowing rotor 6, but instead the openable nozzle molds 19, which can be removed from the injection molds 10, are used for this. Each nozzle mold 19 can have an adapter part, which is grasped by a gripper 39 and taken out of the injection mold 10 with the closed nozzle mold 19 with the preform P located in it. The nozzle mold 19 remains closed and is first opened in the removal and transfer device 38 in the conditioning section 3a, before for example an expanding arbor of the transfer carousel 42 accepts the preform P.

In a further alternative the closed nozzle molds 19 are even directly transferred into the blow-molds 50 of the blowing rotor 6 so that they also act as mold parts during the stretch-blowing process. However, a return device, which is not illustrated, is then needed for the nozzle molds 19.

For the optimum loading of the stretch blowing molds 50 in the blowing rotor 6 (the cycle time for the stretch blowing can be shorter than the cycle time for the injection molding of a preform) it is practicable with respect to the number of blow-molds 50 to provide a larger number of injection molds 10 so that the single-stage process operates under optimized conditions.

In FIGS. 10A to 10D four process phases are illustrated in a further embodiment of the injection mold 10. The injection mold 10 has a bottom and body mold 17 (single or two-part) in which part of the cavity 32 is defined. The nozzle mold 19 can be moved together with the inner arbor 16 relative to the bottom and body mold 17. In this embodiment the inner arbor 16 has an inner through channel 61 which terminates at an opening 59 at the free end of the inner arbor 16. On a carrier part 58 of the nozzle mold 19 and the inner arbor 16 cooling channels 52 are connected to be able to cool the internally cooled inner arbor 16 and, where applicable, also the nozzle mold 19. The bottom and body mold 17 also has cooling channels which are not illustrated. At the upper end of the inner arbor 16 a nozzle 56 is provided to which the melt injection valve is connected, which in this embodiment is formed as a metering needle valve 14 and in each case introduces under control an exactly measured charge. In the inner channel 61 of the inner arbor 16 a needle 57 is movably guided, which at the free end is formed as a stamp 60 which fits relatively tightly into the inner channel 61. A heating channel for the melt, which is not highlighted in further detail, leads to the metering needle valve 14.

Figure 10A:
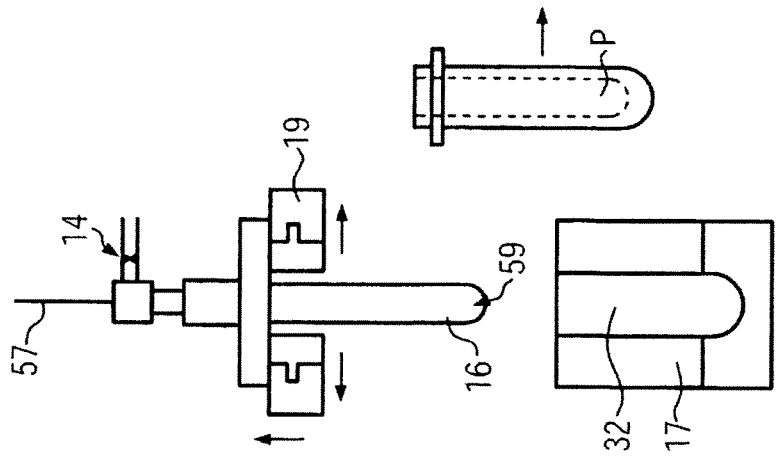

In the process phase illustrated in FIG. 10A with the inner arbor 16 raised and the nozzle mold 19 closed melt from the metering needle valve 14 is introduced via the inner channel 61 into the cavity 32 under slight pressure, filling the lower part of the cavity 32. The needle 57 is in its upper feed position in which it closes the inner channel 61 at the top and releases the flow connection from the metering needle valve into the inner channel 61.

Figure 10B:
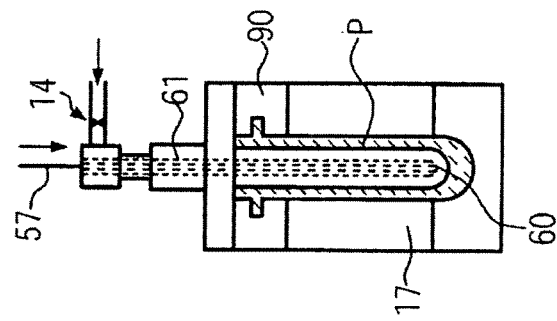

Then between the process phases in FIG. 10A and FIG. 10B the stamp 16 is lowered together with the nozzle mold 19 until the nozzle mold 19 is blocked with the bottom and body mold and the inner arbor 16 has been fixed in its lower end position. In doing this, the inserted inner arbor 16 displaces the melt 35 initially up to the top end of the cavity 32 in the bottom and body mold 17. Until this point the complete melt charge has not yet been introduced.

In the process phase in FIG. 10B the nozzle mold 19 is blocked with the bottom and body mold 17. As before, the needle 57 is in the feed position. The remainder of the melt charge is introduced from the metering needle valve 14 so that the region of the nozzle mold 19 is also filled.

Figure 10C:
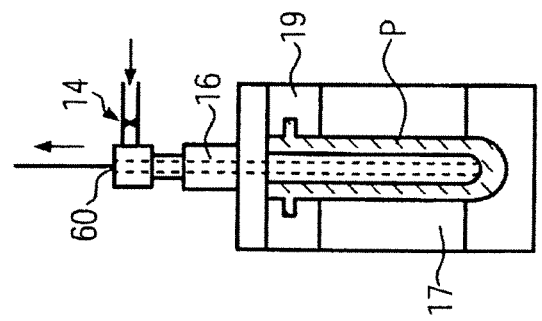

In the next process phase in FIG. 10C the metering needle valve 14 is controlled for closure and the needle 57 displaced in a lower dwell pressure position, wherein the needle 57 with the stamp 60 then presses the remaining as it were temporarily stored melt volume in the inner channel 61 out of the inner channel 61 into the cavity until finally the stamp 60 closes the opening 59 of the inner channel 61.

Figure 10D:
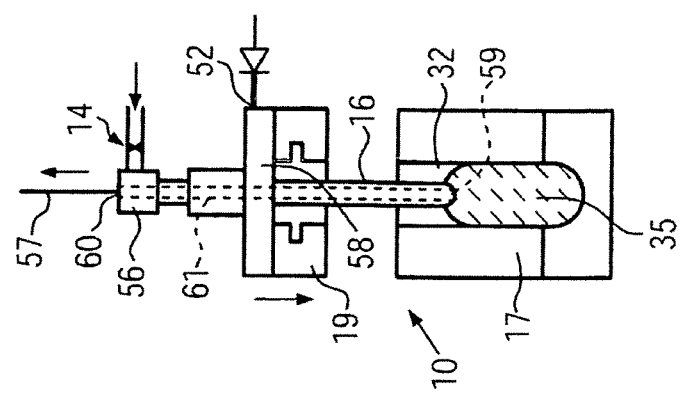

In the process phase in FIG. 10D after the production of the preform P, the inner arbor 16 has been raised relative to the bottom and body mold 17 together with the nozzle mold 19, wherein the preform P remains on the inner arbor 16 and in the nozzle mold 19 and is withdrawn out of the cavity 32. Then the nozzle mold 19 is opened and the preform P removed and transferred to the conditioning section. Simultaneously or soon after, the needle 57 is drawn again into its upper feed position to release the connection between the metering needle valve 14 and the inner channel 61. Then follows the process step according to FIG. 10A.

In an embodiment of FIGS. 10A to 10D which is not illustrated the nozzle mold 19 could also remain on the bottom and body mold 17 while the inner arbor 16 is moved. To remove the preform P the nozzle mold 19 must however be first opened so that the preform can be withdrawn from the cavity 32 with the inner arbor 16.

The invention claimed is:

1. Device for stretch blowing plastic containers in a continuous single-stage process, which simultaneously includes the injection molding of preforms, comprising at least one rotationally driven injection rotor, transfer of the preform via a conditioning section to at least one rotationally driven blowing rotor, stretch blowing of the containers from the preform in the blowing rotor, with a central extruder which feeds injection molds in the injection rotor with melt via controlled valves from an extruder head and through a distributor, the axis of the extruder being positioned at least essentially in the axis of the injection rotor, and at least the extruder head and the melt distributor are permanently and synchronously rotationally drivable with the injection rotor.

2. Device according to claim 1, wherein the complete extruder can be rotationally driven about its axis.

3. Device according to claim 1, wherein the extruder has a pressure section comprising an extruder nozzle and rotationally drivable about the extruder axis and a stationary charging section, and that between the pressure section and the charging section a sealed rotary joint is provided through which an extruder screw extends.

4. Device according to claim 3, and an internally located buffer zone is formed in the extruder in the region of the rotary joint.

5. Device according to claim 3, and wherein the stationary charging section is fixed stationary via a torque support relative to the injection rotor.

6. Device according to claim 1, wherein the distributor has a multi-channel disk, connected to the extruder head, the multi-channel disk being connected to controlled needle valves, mounted on mold carriers of the injection molds.

7. Device according to claim 6, wherein the multi-channel disk is connected to the extruder head for decoupling.

8. Device according to claim 6, wherein the multi-channel disk is connected to controlled needle valves via heated pipes.

9. Device according to claim 1, and a rotary distributor for working media of the injection rotor is arranged on the side of the distributor facing away from the extruder head.

10. Device according to claim 1,
    wherein each injection mold has a bottom and body mold, an openable nozzle mold, and an inner arbor, which moves and is adjustable axially through the nozzle mold.

11. Device according to claim 10, and transportable transfer expanding arbors, which can be actuated in a controlled manner for removal of the preform in each case from the nozzle molds, are assigned to the injection molds along the conditioning section.

12. Device according to claim 11, and an entry carousel with transfer elements is provided between the blowing rotor and the conditioning section for preforms removed from the transfer expanding arbors.

13. Device according to claim 12, wherein the conditioning section is formed either as a rotor-shaped conditioning section with a circumferential link chain and transfer expanding arbors or as a longitudinally extended conditioning loop with a circumferential link chain and inner arbor transfer grippers.

14. Device according to claim 13, and at least one preform cooling/heating station is assigned to the conditioning section formed as a conditioning circuit between the injection rotor and the entry carousel.

15. Device according to claim 13, and at least one cooling station for inner arbors is assigned to the conditioning section formed as a conditioning loop in a return trunk between a transfer carousel and the injection rotor.

16. Device according to claim 10, wherein the nozzle mold is cooled.

17. Device according to claim 10, wherein the inner arbor is internally cooled.

18. Device according to claim 1, wherein each injection mold has a bottom and body and an openable nozzle mold, which can move together with an internally cooled and internally hollow injection inner arbor relative to the bottom and body bold, and that the melt injection valve is a metering needle valve which can be connected to the inner arbor.

19. Device according to claim 18, wherein the hollow inner arbor has an inner channel opening in the region of the free end of the arbor and can be fed via the metering needle valve with melt, and that in the inner channel a needle can be moved between a withdrawn feed position via a melt dwell pressure stroke into a closed position closing the opening of the inner channel.

20. Device according to claim 19, wherein the needle on the free end has a dwell pressure stamp with at least a diameter corresponding approximately to the diameter of the opening of the inner channel.

21. Device according to claim 18, wherein nozzle mold can be actuated via a pneumatic cylinder and an articulated lever mechanism and can be axially blocked via a closing cone with in each case the body mold or the inner arbor.

22. Device according to claim 18, wherein the inner arbor is axially adjustable via one of a hydraulic cylinder, a servo-driven threaded spindle, or a combination thereof and can be blocked in the closed position with the nozzle mold or with the bottom and body mold containing the nozzle mold.

23. Device according to claim 1, wherein each injection mold has an openable bottom and body mold, a nozzle mold, as well as an inner arbor, which is movable through the nozzle mold and removable from the injection mold and which can be transported as a preform transfer element at least along the conditioning section.

24. Device according to claim 23, wherein the removable inner arbor is provided with an adapter part for transfer grippers arranged on a link chain of the conditioning section which is also passed around the injection rotor.

25. Device according to claim 23, wherein in the conditioning section a preform removal and transfer device is included with which the preforms can be removed from the inner arbors and transferred to a transfer carousel operating together with an entry carousel of the blowing rotor.

26. Device according to claim 23, wherein the nozzle mold is cooled.

27. Device according to claim 1, wherein each injection mold has an openable and removable nozzle mold and an internally cooled inner arbor, which is movable through the nozzle mold, and that the nozzle molds with the preforms can be transported by means of transfer elements in the conditioning section at least along the conditioning section.

28. Device according to claim 27, wherein the performs can be further transported into blow-molds of the blowing rotor.

29. Device according to claim 1, wherein the conditioning section is variable in length.

30. Device according to claim 1, wherein the conditioning section defines a separation delay section in the transfer path from the injection rotor to the blowing rotor.

31. Device according to claim 30, wherein the conditioning section is formed as a conditioning circuit.

32. Device according to claim 1, wherein a melt pump is assigned to the extruder.

33. Device according to claim 1, wherein the plastic containers are bottles.

* * * * *